United States Patent [19]

Uematsu et al.

[11] Patent Number: 5,422,648
[45] Date of Patent: Jun. 6, 1995

[54] RECEIVING ANTENNA APPARATUS FOR BROADCAST BY SATELLITE

[75] Inventors: Masahiro Uematsu; Takashi Ojima, both of Tokyo; Kazuo Kato, Yokohama; Makoto Ochiai, Tokyo, all of Japan

[73] Assignees: Nippon Steel Corporation, Tokyo; System Uniques Corporation, Kanagawa, both of Japan

[21] Appl. No.: 988,887

[22] Filed: Dec. 10, 1992

[30] Foreign Application Priority Data

Dec. 10, 1991 [JP] Japan .................. 3-350102

[51] Int. Cl.$^6$ .................. H01Q 3/00; G01S 13/00
[52] U.S. Cl. .................. 342/359; 342/76; 342/92
[58] Field of Search .................. 342/359, 426, 92, 91, 342/96, 73-76, 95, 90, 205, 427, 89, 77; 455/136, 135

[56] References Cited

U.S. PATENT DOCUMENTS

| | | | |
|---|---|---|---|
| 3,197,771 | 7/1965 | Mintzer et al. | 342/89 |
| 3,206,754 | 9/1965 | Morris | 342/89 |
| 4,030,099 | 6/1977 | Valenti et al. | 342/426 |
| 4,331,960 | 5/1982 | Gerst, Jr. et al. | 342/426 |
| 4,801,940 | 1/1989 | Ma et al. | 342/359 |
| 5,061,936 | 10/1991 | Suzuki | 342/359 |

FOREIGN PATENT DOCUMENTS

| | | |
|---|---|---|
| 0373604 | 6/1990 | European Pat. Off. . |
| 2-159802 | 6/1990 | Japan . |
| 2-206779 | 8/1990 | Japan . |
| 2-216074 | 8/1990 | Japan . |
| 2-250502 | 10/1990 | Japan . |

OTHER PUBLICATIONS

Patent Abstracts of Japan vol. 13, No. 245 (P881) 8 Jun. 1989 & JP-A-01 046 670 (Mitsubishi Electric Corp.) 21 Feb. 1989 *abstract*.

Patent Abstracts of Japan vol. 13, No. 467 (p-948) 23 Oct. 1989 & JP-A-01 184 482 (NEC Corp) 24 Jul. 1989 *abstract*.

Primary Examiner—Gregory C. Issing
Attorney, Agent, or Firm—Pollock, Vande Sande & Priddy

[57] ABSTRACT

A receiving antenna apparatus for receiving broadcast by satellite and adapted for mounting on a mobile body in which radio wave interruption tends to occur by obstacles, attains high-speed automatic tracking function capable of catching the satellite again in a short time just after cutting off of radio waves. In the receiving antenna apparatus, an incoming direction of radio waves is roughly detected to limit a search area and then a gain of the tuners is reduced to a value in the tracking control capable of detecting a peak and confirming a main lobe in accordance with power level of the received signal, so that a narrow and fine search may be made only in the limited search area. The antenna apparatus includes a gain setting device for varying gains of AGC of the tuners. Upon searching for the satellite, gains of the tuners are set to a first gain by the gain setting device to perform the rough search and the gains of the tuners are reduced to a second gain level lower than the first gain to perform the fine search. Thus, a time required to catch the satellite after cutting off of radio waves can be reduced.

5 Claims, 8 Drawing Sheets

RECEIVING ANTENNA APPARATUS FOR BROADCAST BY SATELLITE

BACKGROUND OF THE INVENTION

1. Field of the Invention

The present invention relates to an antenna apparatus provided on a mobile body such as an automobile and a ship for receiving radio waves emitted from a satellite such as a broadcast satellite.

2. Description of the Related Art

In a conventional antenna apparatus for a mobile body, as described in Japanese Patent Unexamined Publication No. 02-159802, a planar antenna is divided into a plurality of antennas and a drive signal in an azimuth direction and an elevation direction of the planar antenna is produced from a phase angle indicative of a delay phase of a received signal of a second antenna with respect to a received signal of a first antenna, and an electric motor is driven through a motor driver on the basis of the drive signal to control an attitude of the antenna and the antenna may automatically track to always face toward the satellite. Further, in order to determine whether the antenna catches the satellite or not, an elevation angle of the antenna is changed at intervals of a predetermined pitch and the antenna is rotated in the horizontal direction at each elevation angle. Thus, when a side lobe peak power of the received signal exceeds a predetermined threshold level S, it is judged that the antenna catches the satellite. Japanese Patent Unexamined Publication Nos. 2-206779 and 2-216074 disclose inventions relating to the present invention.

An automatic gain control (AGC) of a tuner unit of the conventional antenna apparatus is attained by a feedback circuit in order to maintain the received signal at a constant level. When radio waves are cut off, the tuner unit of the antenna apparatus is automatic-gain-controlled to maintain a gain of the tuner unit at the value at which the antenna apparatus has caught the satellite, to thereby make determination of a peak position and detection of a main lobe on the basis of signals received up to that time. Such a conventional method has no problem regarding the peak determination and detection of the main lobe, but since a half-power angle of the main lobe is narrow, it has a problem of a narrow detectable width in scanning made on the basis of a signal obtained by subtracting a threshold level from the received signal. Consequently, it is necessary to make narrow a set interval of elevation angle of the antenna apparatus resulting in many times of scanning, so that a time required to retrack the satellite is increased.

SUMMARY OF THE INVENTION

It is an object of the present invention to provide a receiving antenna apparatus for receiving broadcast by satellite including automatic tracking means capable of catching the satellite in a short time after electric waves are cut off.

In order to achieve the above object, the present invention receiving antenna apparatus for receiving broadcast by satellite and which is provided on a mobile body, coarsely detects an incoming direction of radio waves to limit a searching area and reduces a gain of a tuner to such a gain for tracking control that can detect a power peak based on signal level and determine a main lobe, so that a narrow and detailed searching operation is made only within the limited searching area. More particularly, the receiving antenna apparatus of the present invention comprises gain setting means for varying a gain set for AGC of the tuner, whereby the gain is set to a first gain by the gain setting means to perform a coarse search and then reduced to a second gain, lower than the first gain, so as to perform a fine search.

With the above configuration, since the gain of the tuner is increased to a desired value for the search operation on the signal level, a time required to detect a rough incoming direction of radio waves can be made short and the whole time for catching the satellite can be reduced.

DESCRIPTION OF THE PREFERRED EMBODIMENTS

Figure 1:
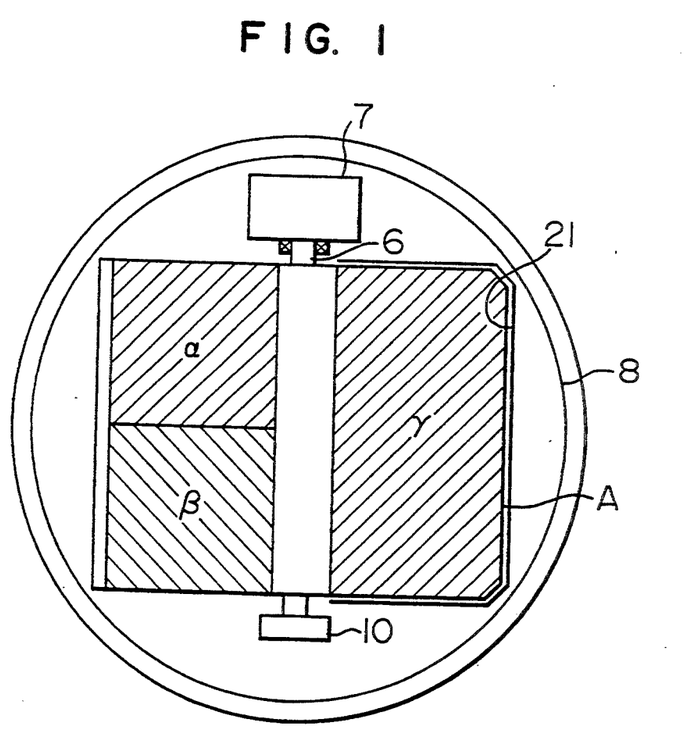
FIG. 1 is a plan view of a receiving antenna apparatus for receiving broadcast by satellite according to one embodiment of the present invention.
Figure 2:
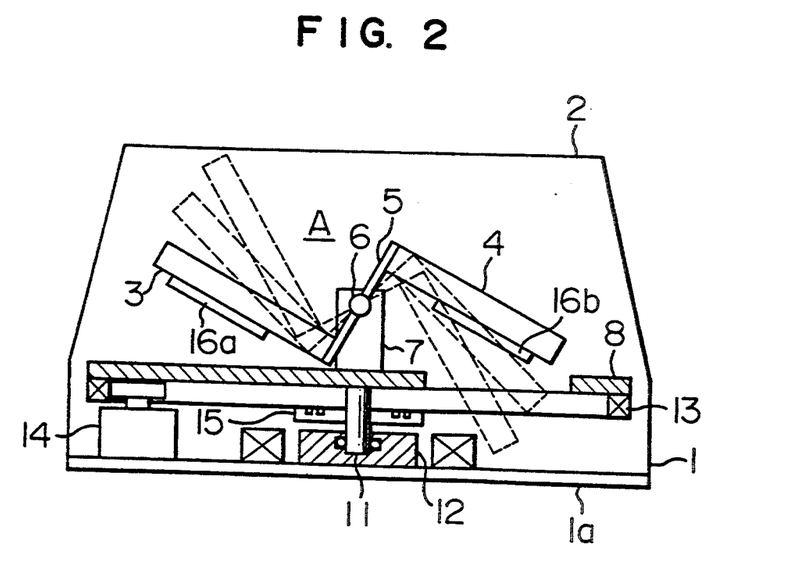
FIG. 2 is a sectional view of the receiving antenna apparatus of the embodiment of FIG. 1.

FIGS. 1 and 2 schematically illustrate a structure of an embodiment of an antenna apparatus of the present invention suitable for mounting on a mobile body. FIG. 1 is a plan view of the antenna apparatus in which a radome 2 is removed and FIG. 2 is a partially sectional view of the antenna as viewed from a side thereof.

A housing 1 is covered by the radome 2 and encloses all of circuits and mechanical units of the antenna apparatus. The antenna apparatus is configured as shown in FIG. 2 and is mounted on a roof of the mobile body such as a train, an automobile or a ship. An antenna unit A which is a main portion of the antenna apparatus includes first and second antenna boards 3 and 4 formed as a planar antenna and a connecting plate 5 for connecting the two boards. The boards 3 and 4 and the plate 5 form a substantial Z shape as shown in FIG. 2.

Each of the first and second antenna boards 3 and 4 forms a tilt angle $\theta$ or an offset angle from the right angle with the connecting plate 5. The tilt angle $\theta$ is set to at least 0° or more, preferably up to 40° in Japan because of the practical drive angle range (23° C. to 53°), so that the first and second antenna boards 3 and 4 may not be overlapped within an incoming path of a received signal even if the antenna unit A is rotated in the elevation direction within the practical drive angle range. In the embodiment, for simplification, the tilt angle $\theta$ is set to zero.

Figure 3:
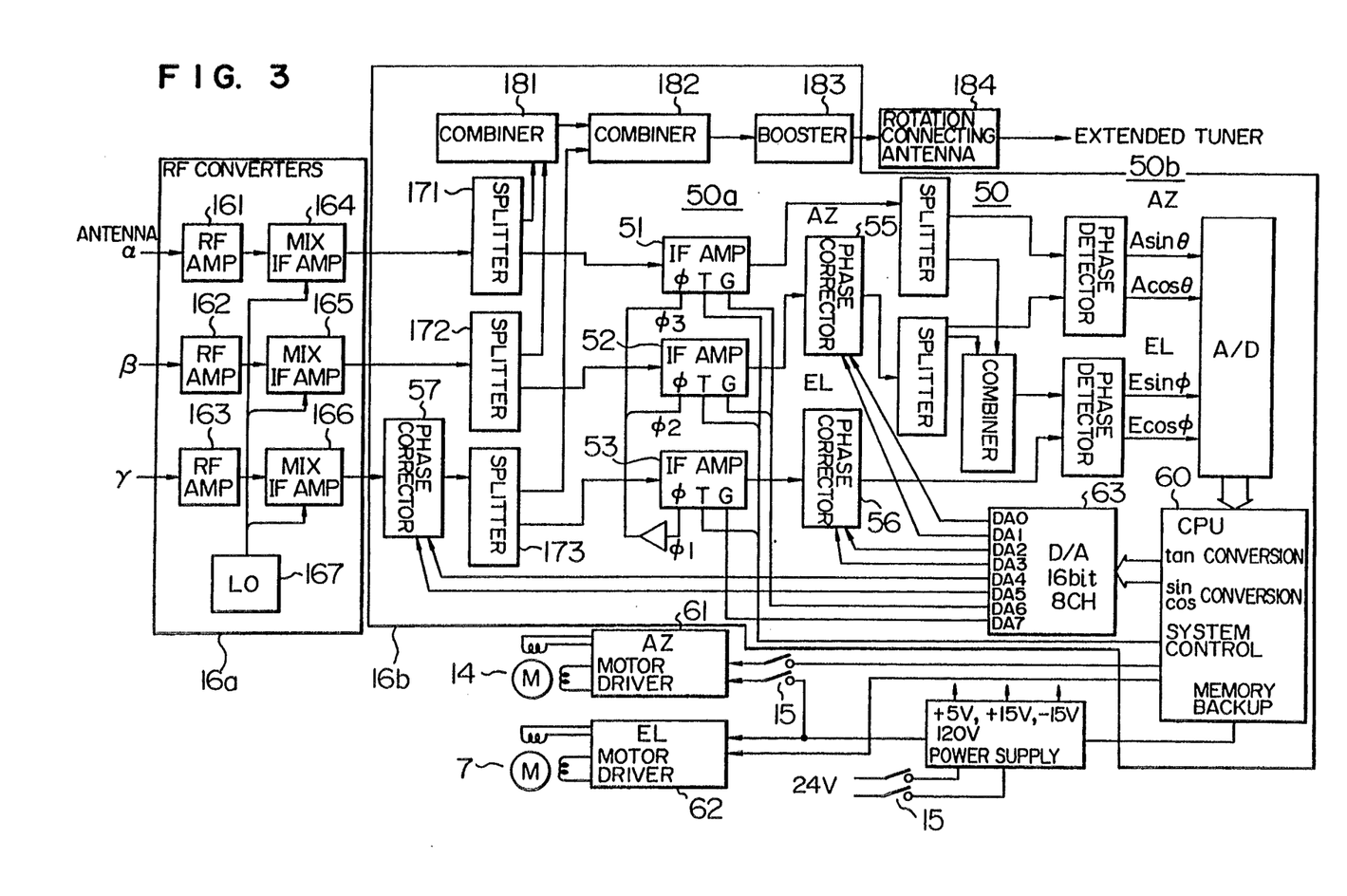
FIG. 3 is a circuit diagram schematically illustrating a circuit in the receiving antenna apparatus of the embodiment.

Disposed within the first and second antenna boards 3 and 4 are, for example, a first portion of an antenna circuit designated as numeral 16a and a second portion of the antenna circuit designated as 16b in FIG. 3. A drive direction of the antenna unit is determined on the basis of a phase difference between the received signals of the first and the second antenna boards.

A rotating axis 6 is mounted on a center portion of the connecting plate 5. The antenna unit A is pivotally driven about the rotating axis 6 in the elevation direction by an elevation motor 7. The antenna unit A is held on a rotating board 8 by means of a bearing plate 10. A rotating axis 11 of the rotating board 8 is mounted in the housing 1 by means of a bearing 12. A rubber belt 13 having a gear formed thereon is engaged with a peripheral gear of the rotating board 8 and a gear fixed onto a rotating axis of an azimuth motor 14 which is fixedly mounted in the housing 1. The rotating board 8 may rotate at any angle out of 360° in the azimuth direction driven by the azimuth motor 14.

An electric circuit 16 including an RF converter 160 and tuners for broadcast by satellite (BS) is divided into two parts 16a and 16b, each of which is fixedly mounted in a rear surface of each of the first and second antenna boards 3 and 4. An output from the electric circuit 16 is transmitted to external tuners via a rotation coupling antenna 184, and a control signal and electric power to the azimuth motor 14 are transmitted through a slip ring 15. A notch or opening 21 is formed in the rotating board 8 for an end of the second antenna board 4 to be lowered below the rotating board 8 of the housing when the antenna unit A is rotated about the rotating axis 6 by the driving force of the elevation motor 7.

A signal system for driving the antenna unit A is now described. The first antenna board 3 is further divided into two parts. When it is assumed that planar antennas $\alpha$ and $\beta$ are formed on the first antenna board 3 and a planar antenna $\gamma$ is formed on the second antenna board, a drive signal for the azimuth direction (in the rotating direction about the axis 11) is obtained from a phase difference between the output signals of the planar antennas $\alpha$ and $\beta$ formed on the first antenna board 3 and a drive signal for the elevation direction (in the rotating direction about the rotating axis 6) is obtained from a phase difference of a composite signal of the output signals of the planar antenna $\alpha$ and $\beta$ from an output signal of the planar antenna $\gamma$.

Output signals of the planar antennas $\alpha$, $\beta$ and $\gamma$ are supplied to the RF converter 160. The RF converter 160 includes RF amplifiers 161, 162 and 163, mixer and IF amplifiers (intermediate frequency amplifiers) 164, 165 and 166 and a dielectric oscillator 167. Output signals of the three antennas are divided by splitters 171, 172 and 173, respectively, and are simple-combined or in-phase-combined by combiners 181 and 182, respectively, to be supplied to an external tuner through a rotation coupling antenna 184. On the other hand, the output signals of the three antennas divided by the splitters 171, 172 and 173 are supplied to an error signal processing circuit 50 including BS tuners 51, 52 and 53 and an error signal detection circuit 50b to be converted into second intermediate frequency signals (about 403 MHz) in the BS tuners and supplied to the error signal detection circuit 50b.

The error signal detection circuit 50b uses the output signals of the BS tuners 51, 52 and 53 to produce azimuth error signals $A\sin\theta$ and $A\cos\theta$ derived from an offset angle $\theta$ of a directing direction of the antenna unit A from the incoming direction of the radio waves projected on an azimuth rotation surface and elevation error signals $E\sin\phi$ and $E\cos\phi$ derived from an offset angle $\phi$ of the elevation direction from the incoming direction of radio waves. A and E represent an amplitude of the respective error signals. These error signals are converted into digital signals by an A/D converter and then supplied to a drive control circuit (CPU) 60 of the elevation motor 7 and the azimuth motor 14. The drive control circuit 60 calculates an azimuth offset data (Da) and an elevation offset data (De) indicative of correction values of the directing direction of the antenna unit A on the basis of the azimuth error signal and the elevation error signal, and transfers the former to an azimuth motor driver 61 and the latter to an elevation motor driver 62. The drive circuits 61 and 62 for the elevation motor 7 and the azimuth motor 14, respectively, rotate the antenna unit A so as to minimize the error. The BS tuners 51, 52 and 53 are provided with a gain control terminal G for the automatic gain control (AGC), respectively, and control signals are supplied through the terminals from the CPU 60 to control the gains of the tuners.

The amplitude A of the azimuth error signal includes a component due to the elevation offset angle $\phi$ and the amplitude E of the elevation error signal includes a component due to the azimuth offset angle $\theta$. However, the amplitude components function equally in the sine azimuth error signal $A\sin\theta$ and the cosine azimuth error signal $A\cos\theta$ extracted simultaneously or the sine elevation error signal $E\sin\phi$ and the cosine elevation error signal $E\cos\phi$ extracted simultaneously. A ratio of the sine azimuth error signal $A\sin\theta$ to the cosine azimuth error signal $A\cos\theta$ is hereinafter named an azimuth absolute error $\tan\theta$ as the amplitude A is countervailed, and a ratio of the sine elevation error signal $E\sin\phi$ to the cosine elevation error signal $E\cos\phi$ is hereinafter named an elevation absolute error $\tan\phi$ as the amplitude E is countervailed.

When the directing direction of the antenna unit A is coincident with the incoming direction of radio waves, the receiving power level becomes maximum. Thus, in the embodiment, a rotation of the phase in the azimuth direction is set as a reference value when a set of the azimuth error signals $A\cos\theta$ and $A\sin\theta$ bring a maximum amplitude component, and a rotation of the phase in the elevation is set as a reference value when a set of the elevation error signals $E\cos\phi$ and $E\sin\phi$ brings a maximum amplitude component to specify the phase angles. Further, the phase angles thus obtained are described by numerical data of n+8 bits (where n is an integer) increasing clockwise from the reference value of phase angle 0° described as (1000 . . . 0) shown in FIGS. 4A and 4B. An angle data is extracted from a table recording predetermined values corresponding to possible angles in the range of 90° within one quadrant.

Figure 4A:
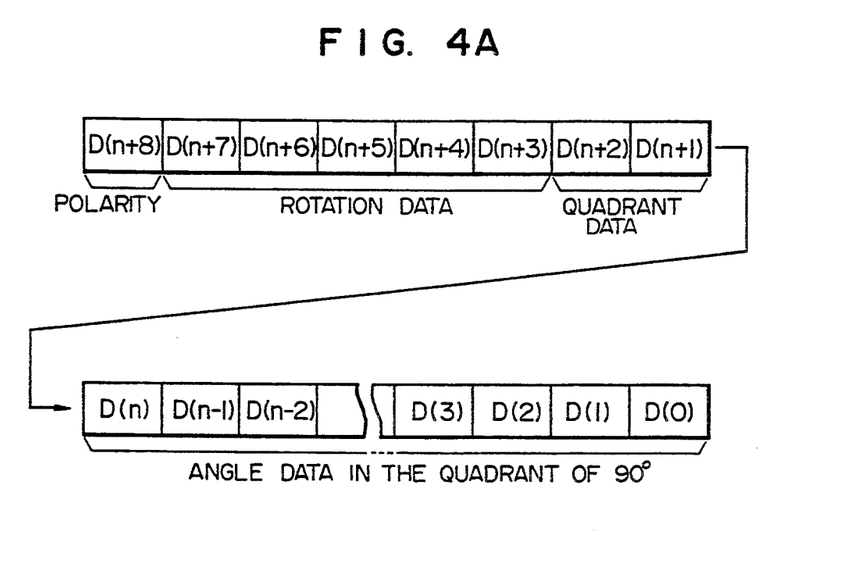
FIG. 4A schematically illustrates a data format of an error signal.
Figure 4B:
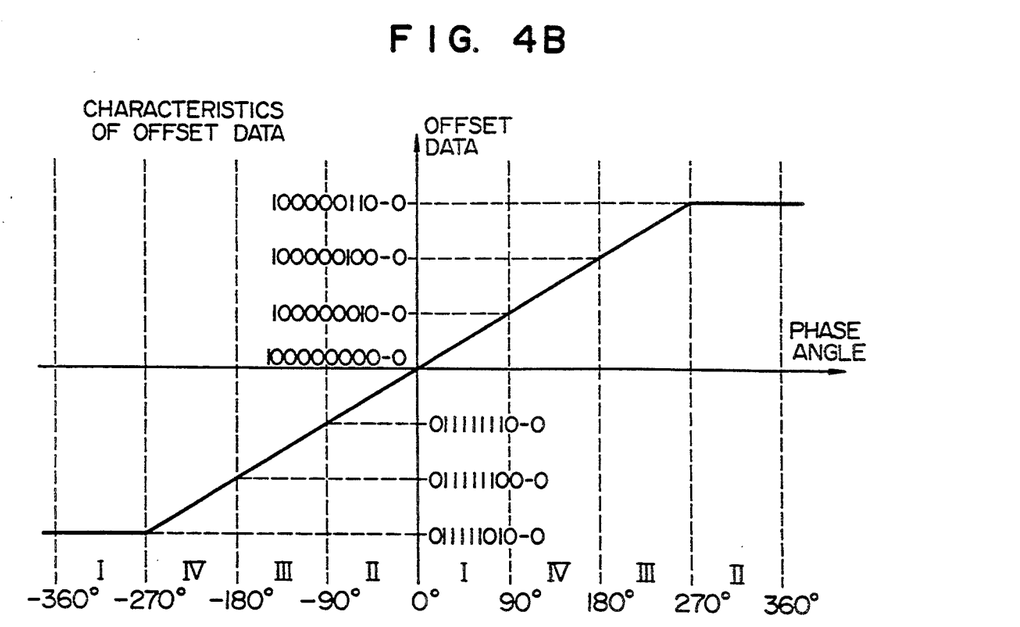
FIG. 4B is a graph illustrating a characteristic of the error signal of FIG. 4A.

As shown in FIG. 4A, the numerical data of the error signal includes the least significant bit (LSB) to n-th bit representing a phase angle (angle data) in the quadrant up to 90°, (n+1)-th and (n+2)-th bits representing the quadrant (quadrant data), (n+3)-th to (n+7)th bits representing a rotation number (rotation data) of the phase, and a (n+8)-th bit (MSB) representing a rotation direction (polarity data) of the phase. That is, the azimuth offset data Da obtained in the CPU is numerical data of (n+8) bits obtained on the basis of the azimuth error signal and the elevation offset data De is numerical data of (n+8) bits obtained on the basis of the elevation error signal. Accordingly, the motor drivers DRVa 61 and DRVe 62 supplied with these data drive to forwardly or reversely rotate the azimuth motor Ma 14 and the elevation motor Me 7, respectively, at a speed proportional to a deviation of the offset data with (1000 ... 0) as the reference.

A principle of searching for the satellite in the antenna apparatus of the present invention is now described.

Upon the beginning of the receiving operation or upon cutting off of radio waves interrupted by an obstacle, the output of the tuner is reduced below the threshold level.

Figure 5:
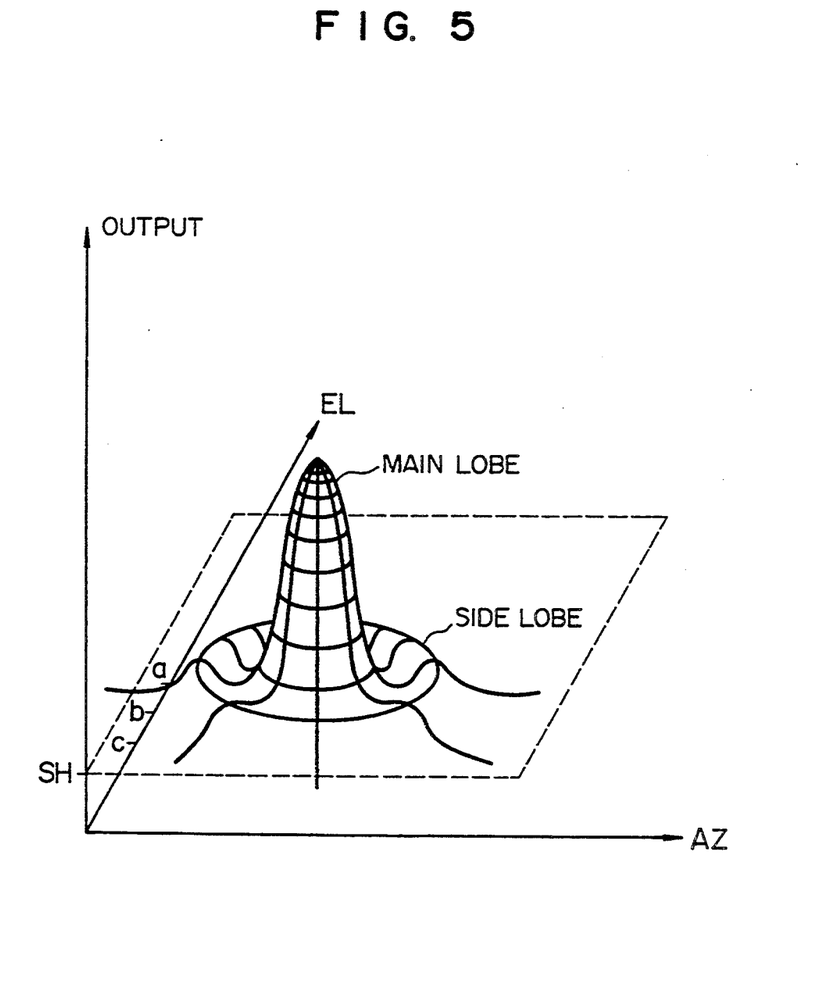
FIG. 5 is a three-dimensional graph illustrating an output of a tuner.

The distribution of the received radio waves spreads shaped as a straw hat on the azimuth x elevation plane as shown in FIG. 5. The search of the satellite is equivalent to detection of an apex of the hat shape distribution and is attained by changing the direction of the antenna so that the azimuth and the elevation are varied to obtain the reception intensity of radio waves by the antenna equal to or closest to the apex of the main lobe.

Figure 6:
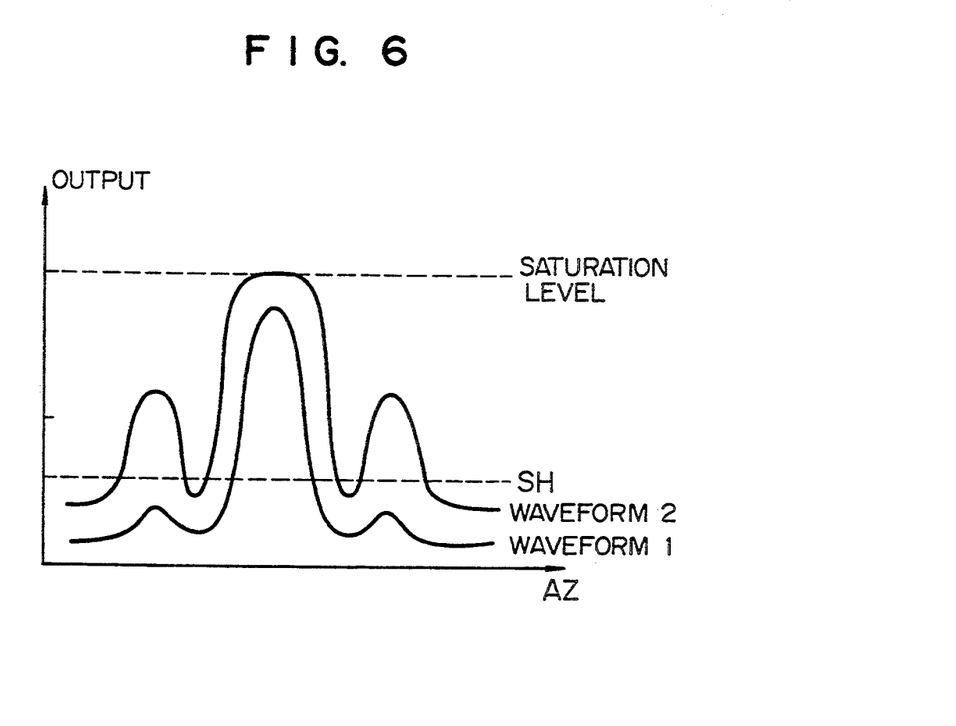
FIG. 6 is a graph illustrating an example of the output of the tuner.
Figure 7:
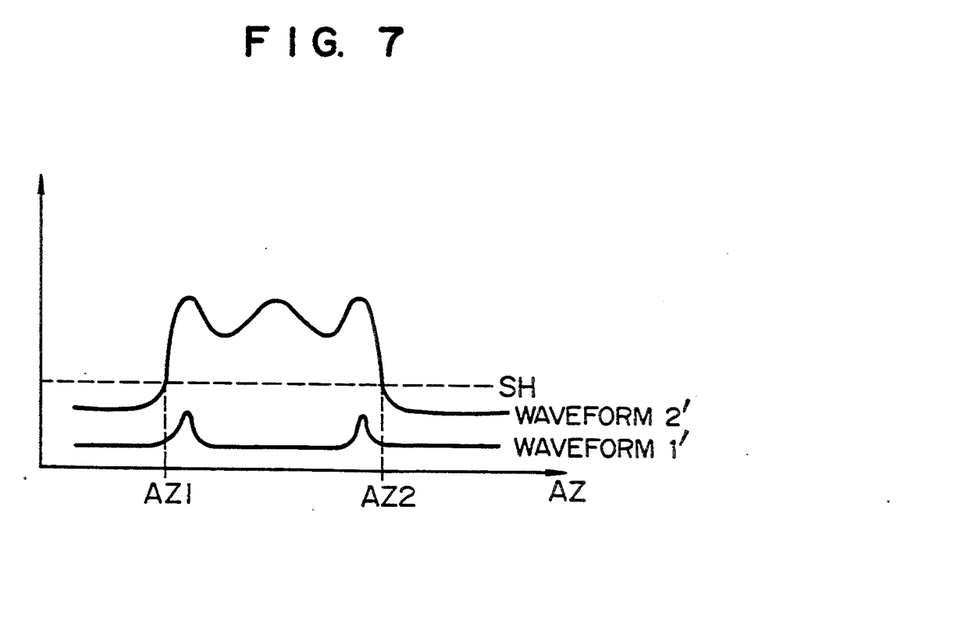
FIG. 7 is a graph illustrating another example of the output of the tuner.

The received signal has two peaks on the main lobe and the side lobe as illustrated in FIG. 5. FIG. 6 shows waveforms on the plane of the azimuth x output at a position of EL=a in FIG. 5. FIG. 7 shows waveforms on the plane of the azimuth x output at a position of EL=b in FIG. 5. The intensity of the received signal is varied as shown in FIGS. 6 and 7 by varying gains of the tuners 51, 52 and 53. Waveforms 2 and 2' of FIGS. 6 and 7 are waveforms in the case where the gains of the tuners 51, 52 and 53 are increased as compared with waveforms 1 and 1'. The main lobe of the waveform 2 of FIG. 6 exceeds a saturation point of the circuit and is saturated.

An actual method of searching for the satellite is now described.

Figure 9:
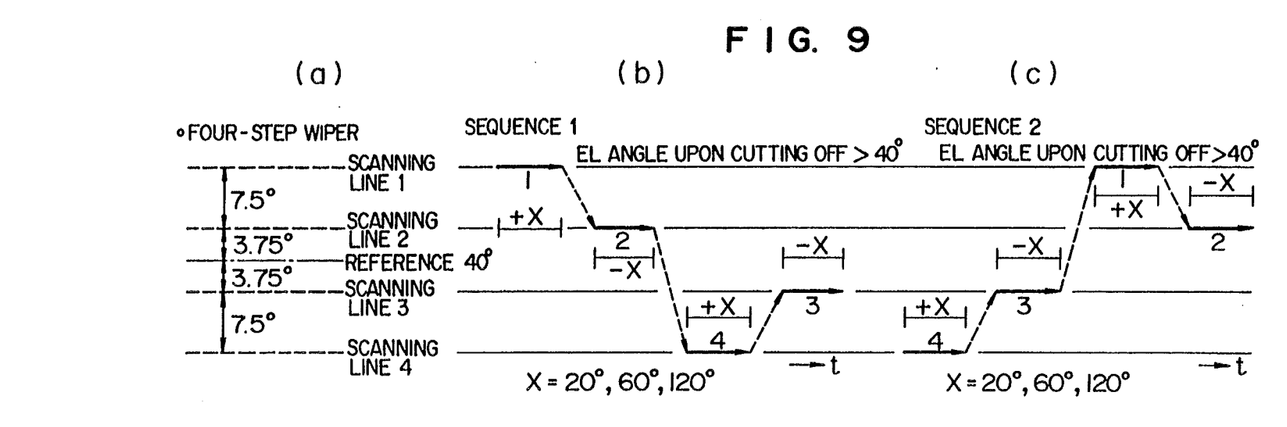
FIG. 9 schematically illustrates a four-step scanning operation.
Figure 10:
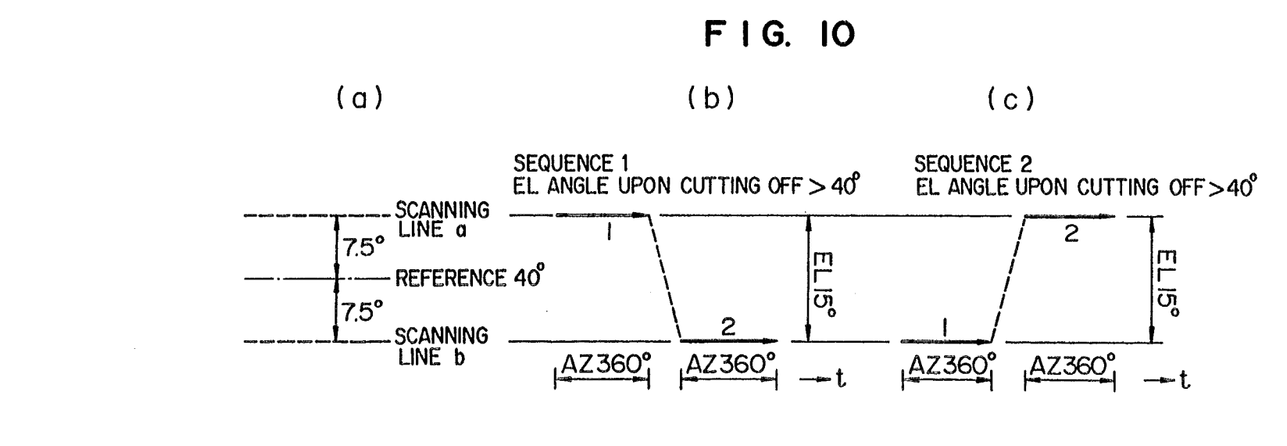
FIG. 10 schematically illustrates a coarse detection operation.

In order to determine an optimum direction of the antenna apparatus rapidly, a rough search is first made as illustrated in FIG. 10 to detect whether the incoming direction of radio waves from the satellite is larger or smaller than the reference elevation angle, and then a fine search in accordance with a "four-step scanning" illustrated in FIG. 9 is made.

The reference elevation angle depends on the latitude of a place where the antenna apparatus is used and the 40th degree of the north latitude is preferably adopted as the reference elevation angle in Japan which spreads from about 23rd degree to 53rd degree of the north latitude.

In the rough search of FIG. 10, scanning lines a and b are provided in positions of +7.5 degree and −7.5 degree with respect to the reference elevation angle of 40th degree.

The rough search is made as follows:

A level of a gain control signal fed back to the gain control terminals G of the tuners 51, 52 and 53 from the CPU 60 is first increased. Consequently, the output levels of the tuners 51, 52 and 53 are increased as a whole as illustrated by the waveform 2 of FIG. 6. Thus, the half-power angle of the received signal is widened and an area exceeding the threshold level SH is also widened. The antenna is rotated maximum 360° along one of the scanning lines a and b nearer to the elevation angle upon cutting off of radio waves to search for a point where the output exceeds the threshold level SH.

In FIG. 5, when it is assumed that the elevation angle EL is fixed to b (EL=b) and the azimuth is varied, the waveform 1' can not exceed the threshold SH as illustrated in FIG. 7 and it is impossible to detect a peak exceeding the threshold SH even if the antenna is rotated by 360° in the azimuth direction. On the contrary, when the gain is increased to obtain waveform 2' illustrated in FIG. 7, the received signal can exceed the threshold SH at the azimuth angle AZ1 of FIG. 7, and accordingly it can be decided that a peak of electric power exists in the vicinity of AZ1. When a point where the output exceeds the threshold level SH can not be detected even if the antenna is rotated up to 360°, the same searching operation is made along the other scanning line. Thus the side with respect to the reference elevation angle and the position or at least the vicinity where the peak of electric power lies can be detected with high probability.

Then, information obtained by the rough search is utilized to make a fine search. In the fine search, as illustrated in FIG. 9(a), a first scanning line is set at an angle of +11.25° with respect to the center of the reference elevation angle 40°, a second scanning line at an angle of +3.75°, a third scanning line at an angle of −3.75°, and a fourth scanning line at an angle of −11.25°. The antenna is rotated in the azimuth direction maintaining the elevation angle at one of the above angles and the fine search is made to detect a point where outputs of the tuners 51, 52 and 53 exceed the threshold level.

Since the half-power angle of the main lobe is usually smaller than 7.5 degrees, the angular difference between the scanning lines is set to 7.5 degrees. This scanning method is hereinafter referred to as the "four-step scanning".

In the fine search, a level of the gain control signal fed back to the gain control terminals G of the tuners 51, 52 and 53 from the CPU 60 is first reduced. Consequently, the output level of the tuners 51, 52 and 53 is reduced as a whole as illustrated by the waveform 1 of FIG. 7. In this state, the fine search using the four-step scanning is made. When the received signal exceeds the threshold SH on the scanning line a during the rough search, that is, when the elevation angle is larger than the reference elevation angle, the scanning is made along the first scanning line with the reduced gain, and then if the main lobe is detected the operation proceeds to a peak detection to be described later. If the main lobe is not detected, the elevation angle is changed to set the scanning line to the second scanning line and another search is carried out. Nevertheless, if the main lobe is not detected even in the second search, the scanning is made along the fourth and third scanning lines, and if the main lobe is detected, the operation proceeds to the peak detection. On the other hand, when the received signal exceeds the threshold SH on the scanning line b during the rough search, that is, when the elevation angle is smaller than the reference value, the scanning is made along the fourth scanning line first with the reduced gain. When the main lobe is not detected in the search, the elevation angle is changed to set the scanning line to the third scanning line and another search is carried out. More particularly, when the threshold SH is exceeded on the scanning line a during the rough search, the azimuth rotation angle is varied in the range of 20° at first in order from the first, second, fourth to third scanning line as shown in FIG. 9(b) to make the search, and if the peak is not detected by the search, the rotation range is successively extended to 60° and 120° to make an additional search. Similarly, when the threshold SH is exceeded on the scanning line b during the rough search, the search is made in order from the fourth, third, first to second scanning line as illustrated in FIG. 9(c). The search is made on the basis of an amplitude data Ran obtained by the mean square value of the sine azimuth error signal $A\sin\theta$ and the cosine azimuth error signal $A\cos\theta$ corresponding to the intensity of the received signal.

Figure 8:
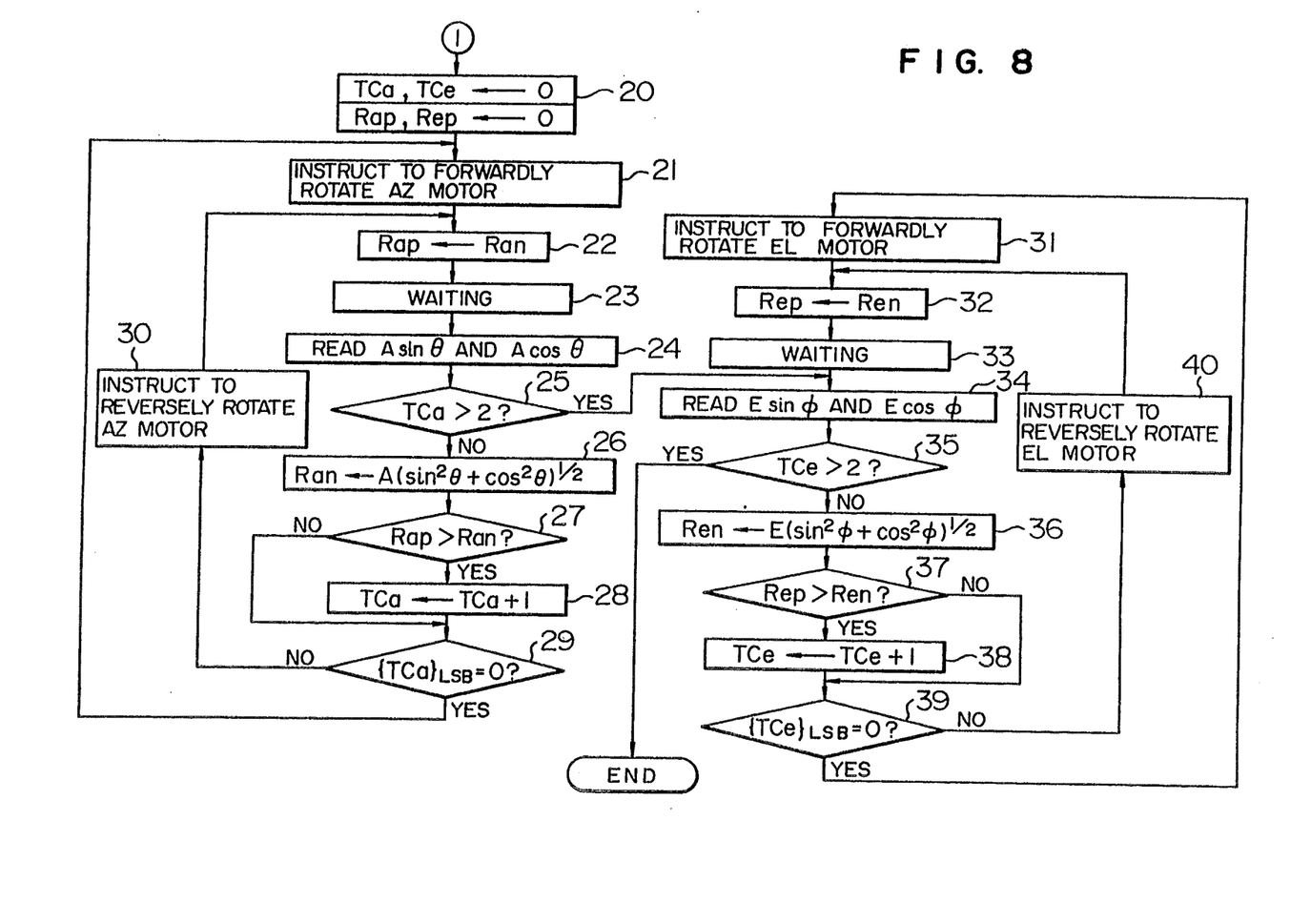
FIG. 8 is a flow chart showing a method for detecting a power peak when the direction has been detected.

When the azimuth amplitude data Ran exceeds a threshold THas predetermined for the amplitude data, the scanning operation is stopped and the peak detection illustrated by the flow chart of FIG. 8 is started. The peak detection is made on the basis of the amplitude data but includes a finer control as compared with the above search. In the peak detection, an azimuth toggle counter TCa, an elevation toggle counter TCe are first cleared and past data of the azimuth amplitude Rap and past data of the elevation amplitude Rep are also cleared (step 20). A proper data Da for azimuth offset is supplied to the azimuth motor driver 61 to instruct for the azimuth motor 14 to rotate in the forward direction (step 21). Then, the azimuth amplitude data Ran until that time is evacuated to the past data Rap of the azimuth amplitude data Rap (step 22). Then, the process is in a waiting state until the directing direction in the azimuth rotation plane is slightly changed with a small increment (step 23). The new sine azimuth error signal $A\sin\theta$ and cosine azimuth error signal $A\cos\theta$ are read (step 24) to obtain the azimuth amplitude data Ran at this time (step 26), which is compared with the azimuth amplitude data before being changed, that is, the past data Rap (step 27).

At this time, if the directing direction of the antenna unit A approaches the incoming direction of radio waves, the azimuth amplitude data Ran shall be larger than the past data Rap, whereas if the directing direction is distant from the incoming direction, the azimuth amplitude data Ran shall be smaller than the past data Rap (refer to FIG. 9). In the former case, small increments of the directing direction may be repeated in the same direction and increase and decrease of the azimuth amplitude data may be repeatedly detected, while in the latter case it is necessary to reverse the change direction. The LSB of the toggle counter Ca is used for judgment of the change direction. That is, when the past data Rap of the azimuth amplitude is larger than the azimuth amplitude data Ran, small increments in the forward direction are made while the LSB of the toggle counter TCa is "0" and small increments in the reverse direction are made while the LSB is "1" (steps 29, 30 or 29, 21).

As described above, each time the past data Rap becomes larger than the azimuth amplitude data Ran, the toggle counter TCa is incremented by 1, accordingly when the value of the toggle counter TCa is equal to or larger than 3, the direction of the antenna unit has crossed the incoming direction of radio waves in the azimuth rotation plane at least two times and the incoming direction of radio waves is substantially corresponding to the directing direction of the antenna unit A with respect to the azimuth rotation plane. Thus, if the value of the toggle counter TCa is larger than 2 (step 25), the peak detection with respect to the azimuth rotation plane has finished, and then the peak detection with respect to the elevation rotation plane is to be made (steps 31 to 40). The peak detection with respect to the elevation rotation plane is quite the same as the peak detection with respect to the azimuth rotation plane only with reading elevation for azimuth, and accordingly its description being omitted. Detailed description of the peak detection is found in Japanese Patent Unexamined Publication No. 2-250502 filed by the present inventors.

Figure 11:
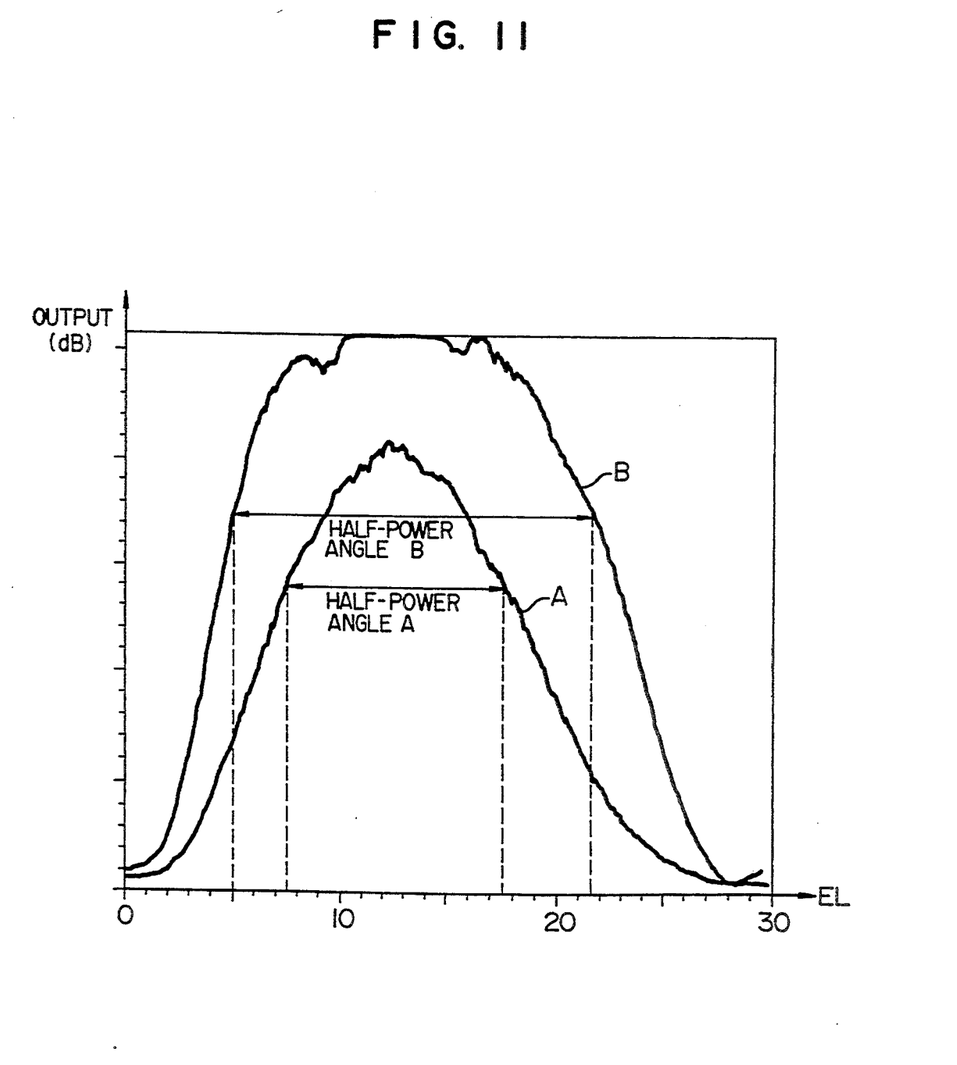
FIG. 11 is a diagram showing waveforms of outputs of a main lobe.

In the of the present invention, the rough search is made within the wide range including the side lobe by increasing the gain of the AGC, while there is a case where a waveform of the main lobe is wide depending on the characteristics of an antenna as shown in FIG. 11. The present invention can be also applied to an apparatus using such an antenna. In this case, the waveform of the main lobe is distorted and a width of the main lobe is enlarged by increasing the gain of the AGC as illustrated by B of FIG. 11, so that a half-power angle of the main lobe is enlarged from A to B. Intervals of scanning lines in the rough search are set to overlap the enlarged half-power angle B, so that the rough search can be made rapidly as compared with a case where intervals of scanning lines are set to overlap the half-power angles A. The fine search following the rough search is the same.

As described above, in the present invention, gain setting means for varying gains for AGC of the tuners is provided, so that upon searching for the satellite the gains are set to a first gain by the gain setting means to perform a rough search and the gains are then reduced to a second gain, lower than the first gain, to perform a fine search. The rough searching method is not limited to the above description.

As described above in detail, according to the present invention, there can be provided the receiving antenna apparatus for receiving broadcast by satellite including automatic tracking means capable of catching the satellite in a short time.

We claim:

1. A receiving antenna apparatus for receiving broadcast by satellite comprising:
   an antenna to be mounted on a mobile body, said antenna being rotatable in horizontal and vertical directions;
   tuners connected to said antenna and having an automatic gain control circuit;
   automatic tracking means for controlling an elevation angle and a rotation angle in the horizontal direction of said antenna so that said antenna can always receive radio waves from the satellite on the basis of out put signals of said tuners; and
   gain setting means for varying a gain of said automatic gain control circuit between a first gain level value and a second value lower than said first value;
   wherein upon search of said satellite the gain is first set by said gain setting means at said first value to perform a coarse search for signals in an incident area surrounded by side lobes and thereafter said gain is reduced to said second value to perform a fine search for acquisition of the satellite.

2. A receiving antenna apparatus according to claim 1, wherein:
   said first value is set so that electric peak power of a side lobe of the received radio waves exceeds a threshold level for determining acquisition of the satellite, and said second value is set so that said electric peak power of said side lobe is lower than said threshold level for determining the acquisition of the satellite and electric peak power of a main lobe may exceed the threshold level.

3. An antenna apparatus according to claim 1, wherein said automatic tracking means includes means for varying the elevation angle at intervals of a predetermined pitch upon the search of said satellite and for rotating said antenna in the horizontal direction at a plurality of elevation angles to determine that said antenna has acquired the satellite when an electric peak power of a side lobe of the received signal exceeds a threshold level for the determining of the acquisition of the satellite, the predetermined pitch for varying the elevation angle upon the fine search being smaller than that for the coarse search.

4. An antenna apparatus according to claim 1, wherein said first value is set so that a width of a side lobe of received radio waves is larger than an interval of scanning lines predetermined with respect to the reference elevation angle, and said second value is set so that electric peak power of the main lobe is larger than a threshold level.

5. A receiving antenna apparatus for receiving broadcast by satellite comprising:

an antenna to be mounted on a mobile body, said antenna being rotatable in horizontal and vertical directions;

tuners connected to said antenna and having an automatic gain control circuit;

automatic tracking means for controlling an elevation angle and a rotation angle in the horizontal direction of said antenna so that said antenna can always receive radio waves from the satellite on the basis of output signals of said tuners; and gain setting means for varying a gain of said automatic gain control circuit between a first gain level value and a second value lower than said first value;

wherein upon search of said satellite the gain is first set by said gain setting means at said first value to perform a coarse search for detecting incoming direction of radio waves to limit a searching area to an incident area surrounded by side lobes and thereafter said gain is reduced to said second value to determine a main lobe and perform a fine search for acquisition of the satellite.

* * * * *